Nov. 13, 1962  G. C. LENNOX  3,064,225
WIRING DEVICE

Filed Aug. 13, 1959

Nov. 13, 1962  G. C. LENNOX  3,064,225
WIRING DEVICE
Filed Aug. 13, 1959  2 Sheets-Sheet 2

United States Patent Office 3,064,225
Patented Nov. 13, 1962

3,064,225
WIRING DEVICE
George C. Lennox, Southbury, Conn., assignor to The Bryant Electric Company, Bridgeport, Conn., a corporation of Connecticut
Filed Aug. 13, 1959, Ser. No. 833,455
6 Claims. (Cl. 339—56)

The present invention relates to electrical wiring devices and more particularly to holders employed for energizing and supporting electrical discharge devices.

The energization of load apparatus, such as electrical discharge devices, may be accomplished through the use of wiring devices in which means are provided for transmitting electrical energy from power conductors to the apparatus. Not only is it necessary to provide, in wiring devices, certain safety and other operational features, but it is also necessary for purposes of economy to minimize the amount of material employed in fabricating these devices and, additionally and just as importantly, to simplify the assembly of these devices. Clearly, to achieve these operational and economic objectives, selected physical principles are to be employed inventively in arranging physical elements as useful wiring devices. It is in the perspective of these general considerations that the present invention will be better understood.

Thus, it is an object of the invention to provide a wiring device for which the amount of material employed is reduced and for which the method of assembly is simplified.

It is another object of the invention to provide a wiring device having the attributes just mentioned and additionally being flexibly adaptable for use with a variety of electrical discharge device arrangements.

It is a further object of the invention to provide a readily assembled lampholder being flexibly adaptable for supporting and energizing fluorescent lamps such that selectively varied sizes and numbers of lamps can be supported with selectively varied spacings between the lamps.

An additional object of the invention is to provide a lampholder comprising a mounting bracket, conductive means for transmitting electrical energy, and an insulative housing having a plunger element for the conductive means, all of which are assembled to form the lampholder with a minimum use of separate fasteners and separate insulative material.

These and other objects of the invention will become more apparent upon consideration of the following detailed description of an illustrative embodiment of the invention as related to the attached drawings, in which.

With regard to the broad aspects of the invention, a mounting bracket of a lampholder is constructed to support a selected number of housing elements that support other operational elements of the lampholder. Each housing element is integrally formed from insulative material and is adapted for ready attachment to the bracket and, additionally, for ready reception and engagement of the other elements of the lampholder including those operating to energize and support an inserted lamp. It is to be emphasized that the illustrated lampholder is only exemplary of wiring devices that can be embodied for useful operation in accordance with the principles of the invention.

Figure 1:
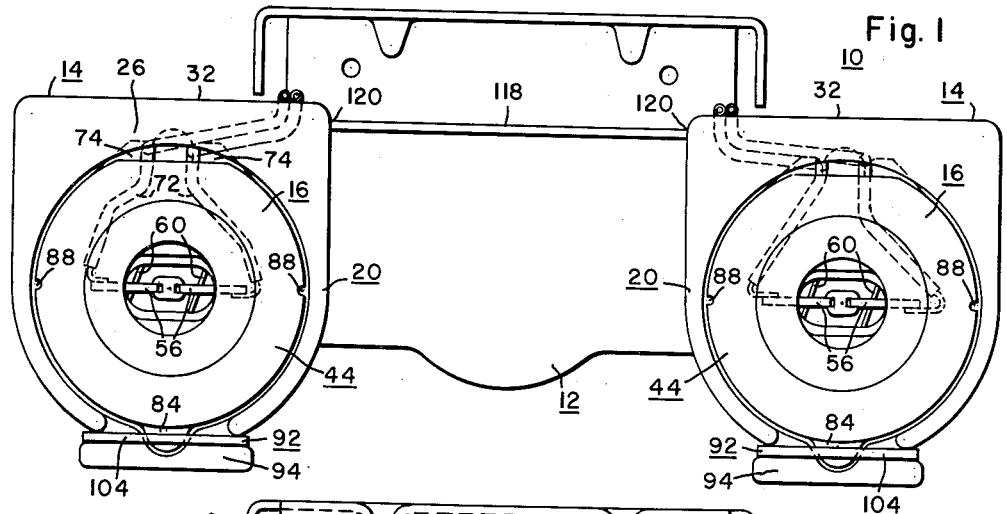
FIGURE 1 is a front plan view of a lampholder constructed in accordance with the principles of the invention.
Figure 2:
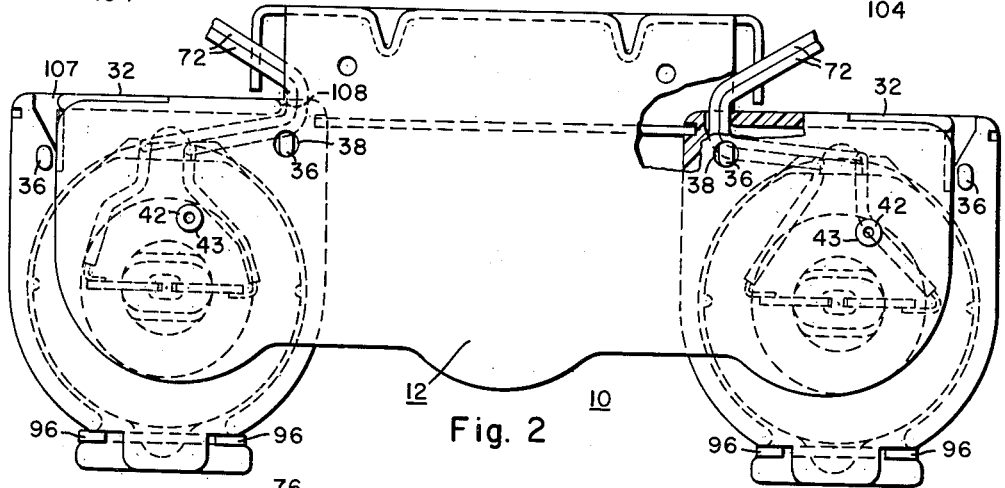
FIG. 2 is a rear plan view of the lampholder shown in FIG. 1, with portions of the lampholder being removed.

With these precepts in the foreground, the detailed description will now be set forth. As shown in FIGS. 1 and 2, a lampholder 10 includes a structural member or bracket 12 for mounting the lampholder 10 on a suitable support (not shown), unitary housing elements on members 14 that can be attached to the mounting bracket 12, and a contact and plunger assembly 16 positioned in each of the housing members 14 for energizing and resiliently supporting electrical discharge devices or lamps (not shown) insertable in the housing members 14, respectively. Of course, each of the opposite ends of a discharge device is to be supported by similarly positioned lampholders 10.

Each of the housing members 14 is provided with a base wall 18 (FIG. 6) for support of the contact and plunger assembly 16 and for securance of the housing member 14 to the mounting bracket 12. A peripheral wall 20 (FIG. 5) is extended transversely of the base wall 18 to provide a generally cylindrical chamber 22 in the housing member 14 for reception of the contact and plunger assembly 16. A pocket 24 is formed under an overhang sembly 16. A pocket 24 is formed under an overhang 26 extended transversely and inwardly of the peripheral wall 20, and the pocket 24 is located adjacent to, and extended in the direction of the longitudinal axis of, the chamber 22 and adjoins an opening 28 through the rear or underside of the housing member 14 adjacent to a portion 30 of an edge of the base wall 18. Thus, the pocket 24 under the overhang 26 is open laterally to the chamber 22 and open longitudinally to the exterior through the underside of the housing member 14. A back wall 32 for the pocket 24 is formed by a planar portion of the peripheral wall 20, and side walls 34 of the pocket 24 are formed by generally flat surfaced portions of the peripheral wall 20 extended transversely from the back wall 32.

In order to secure the housing member 14 to the bracket 12, projections 36 (FIGS. 2 and 6) are extended from the underside of the housing member 14 for cooperative engagement with suitably located openings 38 (FIG. 2) in the bracket 12. Additionally, an opening 40 is provided in the base wall 18 of the housing member 14 for passage of a fastener 42 into a correspondingly located opening 43 in the bracket 12 (FIG. 2).

It is to be noted at this point that the overall symmetry of the housing member 14 affords considerable flexibiliy in the choice of the number of housing members or units 14 that are to be assembled with any one bracket 12. Thus, a suitably sized bracket 12 provided with appropriately spaced openings 38 and 43 can be provided for whatever number of housing units 14 a user may desire to employ. The presently described embodiment, of course, illustratively shows the use of a pair of housing members 14.

Each of the housing members 14 is secured to the bracket 12 by attaching the fastener 42, here in the form of a rivet, to the housing member 14 and the bracket 12 through the openings 40 and 43 thereby clamping the housing member 14 against separation from the bracket 12. Additionally, one of the housing member projections 36 is extended through the opening 38 to engage cooperatively the bracket 12 and secure the housing member 14 against rotary movement with respect to the bracket 12.

When the housing members 14 are secured, as related, to the bracket 12, a contact and plunger assembly 16 can be inserted in each of the housing members 14. It will only be necessary here to describe the energizing portion of the contact and plunger assembly 16 to the extent that it is related to the present invention. For a thorough description of the physical principles related to the structure and operation of the energizing portion of the contact and plunger assembly 16, reference is made to U.S. Patent 3,002,171 of G. C. Lennox, entitled "Wiring Device," issued September 26, 1961 and assigned to the present assignee.

Figure 3:
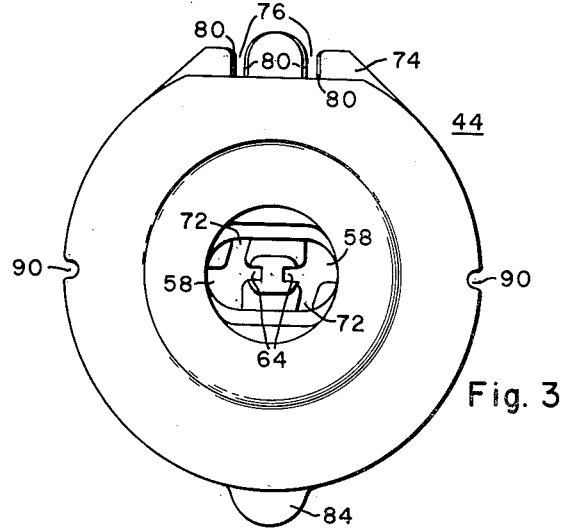
FIG. 3 is a front plan view of a plunger element shown assembled with the lampholder of FIG. 1.
Figure 4:
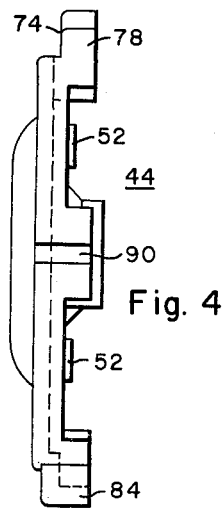
FIG. 4 is a side view of the plunger shown in FIG. 3.
Figure 7:
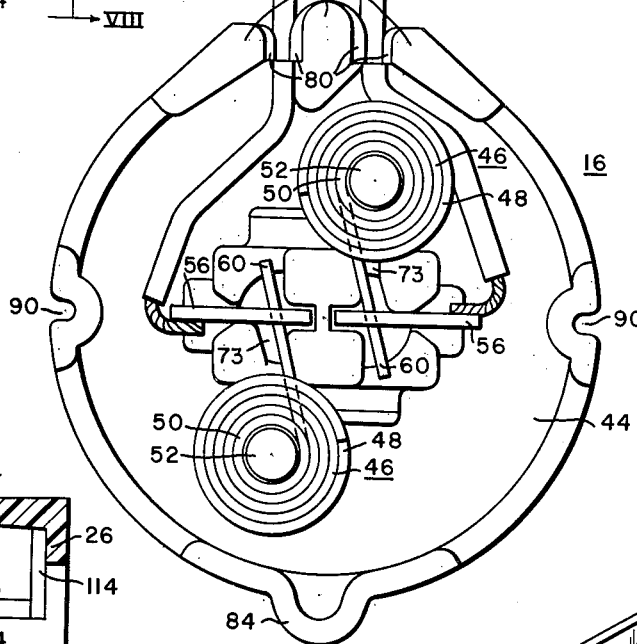
FIG. 7 is a rear plan view of the plunger shown in FIG. 3 along with an assembled conductive arrangement for the lampholder shown in FIG. 1.

A lamp supporting slider or plunger 44 (FIGS. 3, 4 and 7) is positioned in each housing member 14 to be guided in movement along the longitudinal axis of the cylindrical chamber 22. A pair of helically coiled spring elements 46 provide forces to bias the plunger 44 in a direction that is outward of the housing member 14. A base coil (or coils) 48 of each of the springs 46 is positioned adjacent to the base wall 18, and a top coil (or coils) 50 of each of the springs 46 is positioned to circumscribe a cylindrical projection 52 downwardly extended from the underside of the plunger 44. Additionally, the base coil (or coils) 48 of one of the springs 46 is (or are) positioned to circumscribe a boss 54 extended upwardly from the base wall 18. It is through the base wall boss 54, in this embodiment, that the opening 40 is extended for passage of the fastener 42 to secure the housing member 14 to the bracket 12.

When assembled with the housing member 14 in a manner to be subsequently described, the portion of the contact and plunger assembly 16 thus far described provides spring support for a discharge device inserted in the housing member 14. In order to provide for transmission of electrical energy to the discharge device, spaced contact elements 56 are engaged with the plunger 44. Each of the contacts 56 is spring seated in a passage 58 extended through the plunger 44. The passages 58 are spaced from each other so that when the discharge device, having recessed contact portions as exemplarily provided for here, is positioned against the front side of the plunger 44, the contact portions of the discharge device are received in the passages 58, respectively, for engagement with the positioned contact elements 56, respectively.

Figure 10:
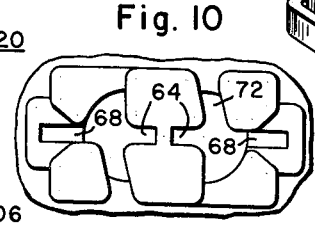
FIG. 10 is a partial rear view of the plunger shown in FIG. 3.
Figure 11:
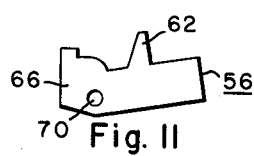
FIG. 11 is a side view of a contact shown in FIG. 7 in assembled relation with the plunger.

The previously mentioned spring seating of each of the contact elements 56 is accomplished through the use of an arm 60 (FIG. 7) extended laterally from the top coil 50 of each of the springs 46. A projecting portion 62 of each contact 56 (FIG. 11) is positioned in a groove 68 (FIG. 10) adjacent one side of each of the passages 58, and an offset portion 66 of each contact 56 is positioned for guided movement in a slot 64 adjacent the opposite side of each passage. The arm 60 of each spring 46 is passed through an opening 70 in the adjacent contact 56 so that when the top coil (or coils) 50 of the spring element 46 is (or are) passed over the projection 52 of the plunger 44, in the manner previously described, the arm 60 of the spring 46, extended through a lateral slot 73 of the plunger (FIG. 7), then provides spring forces that react against inward movement of adjacent contact 56 along its groove 68 and slot 64. In addition to the mentioned inward movement, pivotal movement of the contact 56 about the spring arm 60, for improved electrical connections with a supported discharge device of the recessed-contact type previously indicated, occurs when forces are imposed upon contact portions, such as the projecting portion 62, that are laterally offset from the upstanding plane in which the spring arm 60 is located. A power conductor 72 can be attached, if desired, to each contact 56 by any conventional method.

In order to complete the assembly of the lampholder 10, a contact and plunger assembly 16 can be supported in each of the housing members 14. As a first step in the insertion of a contact and plunger assembly 16 in the housing member 14, a ledge 74 set under the front side of the plunger 44 and extended laterally therefrom is positioned in the pocket 24 under the housing overhang 26. Concurrently with this step, the spring 46 engaging the plunger projection 52 that is nearest to the plunger ledge 74 is positioned so that the base coil (or coils) 48 circumscribes (or circumscribe) the base wall boss 54 in the manner previously described.

At this point, it is to be noted that the power conductors 72 extending from each of the spring seated contacts 56 are passed through spaced slots 76, respectively, that are cut out of a plunger portion 78 which forms the laterally extended ledge 74. It is also to be noted that ridges 80 are extended into each slot 76 (FIG. 7) to form a narrowed slot portion through which the adjacent power conductor 72 is forced to be retained in another slot portion which is wider than the narrowed portion and is located between the ridges 80 and the plane of the plunger ledge 74.

Figure 5:
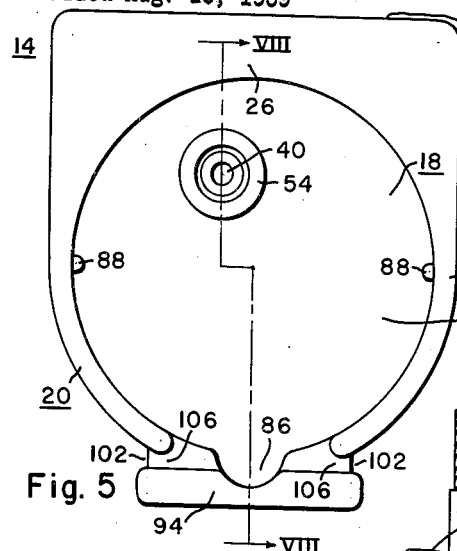
FIG. 5 is a front plan view of a housing element shown assembled with the lampholder in FIG. 1.
Figure 6:
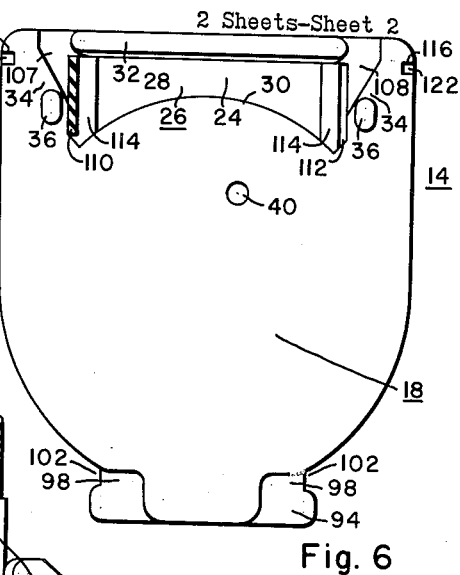
FIG. 6 is a rear plan view of the housing element of FIG. 5.

To provide guided movement of the plunger 44 in the chamber 22, a lateral projection 84 of the plunger 44, positioned diametrically oppositely from the laterally extended ledge 74, interfits with an upstanding groove 86 in the peripheral wall 20 of the housing member 14 (FIG. 5). Since the sectional outline of the groove 86 conforms to that of the plunger projection 84, guidance is provided for movement of the plunger 44 along the axis of the housing chamber 22.

To prevent tipping of the plunger 44 during its guided movement in the chamber 22, oppositely stationed upstanding ribs 88 are projected from the peripheral housing wall 20. The housing ribs 88 interfit with conformally shaped grooves 90 of the plunger 44.

Figure 8:
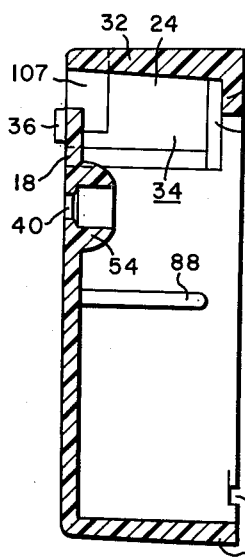
FIG. 8 is a sectional view of the housing element taken along the reference line VIII—VIII of FIG. 5; and, FIG. 9 is an isometric view of a retaining member shown assembled with the lampholder in FIG. 1.
Figure 9:
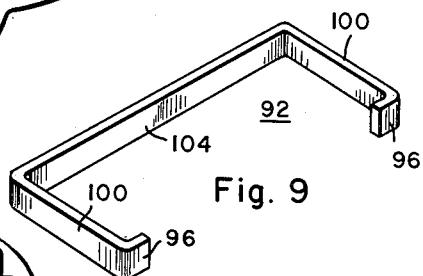

In continuation of the description of the assembly procedure for the lampholder 10, a clip member 92 can next be attached to the housing member 14 to retain the contact and plunger assembly 16 in the chamber 22. A portion 94 of the peripheral housing wall 20, being provided with the housing member groove 86, is generally formed to receive the retaining clip 92 in engaging relation. Thus, the portion 94 of the peripheral wall 20 is generally rectangular in section to conform to the form of the clip 92 as is readily observable, the clip 92 can be attached to the housing member 14 so as to straddle the peripheral wall portion 94. In the attached position, free or hook ends 96 of the clip 92 bear against undersurface 98 (FIG. 6) of the peripheral wall portion 94 so that legs 100 of the clip 92 are positioned in upstanding grooves 102 in the peripheral wall portion 94, and a cross arm 104 of the clip 92 is extended through a lateral groove 106 (FIGS. 5, 8) in the peripheral wall portion 94 to bridge the upstanding groove 86 in which the plunger projection 84 is guided during movement of the plunger 44. In this arrangement, it is to be noted that the clip 92, being formed from a resilient material for ready engagement with the housing member 14, provides a limit of movement for the plunger 44 since the cross arm 104 of the clip 92, bridging the groove 86 of the housing member 14, forms a stop position for movement of the plunger projection 84 in the groove 86.

The power conductors 72, being connected to the contact elements 56, respectively, are passed out of the housing member 14 for an external supply of power through wire channels 107 and 108 extended laterally from the pocket 24 through the side walls 34 to the outward side of the peripheral wall portion that forms the back wall 32. This arrangement for passage of the power conductors 72 is provided in order that the base wall 18 of the housing member 14 can be firmly seated against the mounting bracket 12 without interference from the power conductors 72.

Each wire passage channel 107 or 108 can accommodate the pair of conductors 72 that are extended from the contact and plunger assembly 16. In certain relations of the housing member 14 with respect to the mounting bracket 12, it may be desirable to use only the wire passage channel 107, while in other relations it may be desirable to use only the other wire passage channel 108. In either event, the wire passage channel 107 or 108 that is not utilized can be closed by an insulator 110 for safety purposes.

The insulator 110 (FIG. 6) is appropriately sized in a generally rectangular shape and is passed into the pocket 24 of the housing member 14 along the inner surface of the side wall 34 so that an end of the insulator 110 is tightly received in a notch 112 provided between the side wall 34 and a rib 114 extended downwardly from the overhang 26. The longitudinal dimension of the insulator 110 is sufficient for it to extend from the underside of the overhang 26 in the notch 112 along the inner surface of the side wall 34 to the plane of the underside of the base wall 18. Thus, when the insulator 110 is inserted into its described position in the pocket 24 prior to assembly of the housing member 14 with the mounting bracket 12, and upon subsequent assembly of the housing member 14 with the bracket 12, in the manner previously described, the insulator 110 is abutted at its free end by the mounting bracket 12 and therefore retained in engagement with the housing member 14. Since the conductor passages 107 and 108 are laterally extended through the side wall 34, respectively, it is obvious that the engaged insulator 110 is extended across, and therefore closes, the adjacent wire entrance channel 107 or 108.

Another structural provision to be noted is the upstanding grooves 116 in the outer side of the peripheral wall 20 (FIG. 6) for reception of a closure plate 118. The closure plate 118 (FIG. 1) can be engaged in the grooves 116 to extend between spaced housing members 14 mounted on the bracket 12. If the closure plate 118 is to be employed, as in this embodiment of the invention, opposite end portions 120 of the plate 118 are guided into the adjacent grooves 116, respectively, of the housing members 14 prior to securing the housing members 14 to the bracket 12. When the housing members 14 are then secured to the bracket 12 in the manner previously described, the plate end portions 120 are firmly engaged in the grooves 116, respectively, between an upper ledge 122, extended transversely across each groove 116, and the front side of the mounting bracket 12. With the use of the closure plate 118, the conductors 72 are closed from external access and a finished appearance is provided for the lampholder 10.

It will be recognized that through the employment of the principles described here, a wiring device of flexible utility can be fabricated. The desired number of housing members can be secured, with desired spacing, to a mounting bracket that is adaptable to accommodate the desired arrangement of housing members. Load apparatus or a discharge lamp can be inserted in each of the housing members to be supported resiliently by a contact and plunger assembly for energization from power conductors.

Further, through the employment of mutually acting forces between the various physical elements of the invention, a simplified assembly and therefore an economy of construction is achieved for a wiring device. Added economy is provided in that the required number of separate insulated elements is minimized.

In the foregoing description, the mode of operation of an arrangement of specified elements has been related to point out the principles of the invention. The description, therefore, has only been illustrative, and, accordingly, it is desired that the invention be not limited by the arrangement or embodiment described here but, rather, that it be accorded an interpretation consistent with the scope and spirit of its broad principles.

What is claimed is:

1. A wiring device comprising a housing having a cavity extended inwardly from an open side thereof, an insulative plunger member being positioned in said cavity for movement to and from said open side, spring means positioned in said cavity and biasing said plunger outwardly of said cavity, contact means being supported by said plunger, a portion of said housing being engageable with a portion of said plunger to limit the movement of said plunger outwardly of said cavity, said plunger being assembled with said housing through said housing open side, to be located under said housing portion, and an elongated resilient clip being supported by said housing to extend across a portion of the opening and said open side to retain said plunger after assembly and also to limit the movement of said plunger outwardly of said cavity.

2. A wiring device comprising a housing having a cavity extended inwardly from an open side thereof, an insulative plunger member being positioned in said cavity for movement to and from said open side, spring means positioned in said cavity and biasing said plunger outwardly of said cavity, contact means being supported by said plunger, interfitting upstanding ribs and grooves provided on said plunger and on said housing adjacent said cavity, correspondingly, to guide and stabilize said plunger during said movement, a portion of said housing being engageable with a portion of said plunger to limit the movement of said plunger outwardly of said cavity, said plunger being assembled with said housing through said housing open side, to be located under said housing portion, and an elongated resilient clip being supported by said housing to extend across one of said grooves which communicates with said open side thereby to retain said plunger after assembly and also to limit the movement of said plunger outwardly of said cavity.

3. A wiring device comprising a bracket member for mounting a housing of insulative material having a cavity extended inwardly from an open side thereof, an insulative plunger member being positioned in said cavity, means for limiting movement of said plunger outwardly of said cavity, spring means being positioned in said cavity and biasing said plunger toward said open side, spaced contact elements being supported by said plunger and respectively engaging power conductors, spaced elongated channels being open through the side of said housing opposite said open side and extending longitudinally from said cavity to the exterior of said housing substantially parallel to said opposite side for passage of said conductors from said plunger to an external energy source, any of said channels being useable for this purpose on the basis of conveniency, respective insulative members being positioned in said housing to close each of the unused channels for safety purposes, and means for securing said housing to said bracket member, said bracket member engaging said insulative member to hold the latter in said channel closing positions.

4. A wiring device comprising a housing having a cavity extended inwardly from an open side thereof, an insulative plunger member being positioned in said cavity for movement to and from said open side, spring means positioned in said cavity and biasing said plunger outwardly of said cavity, contact means being supported by said plunger, a portion of said housing being engageable with a portion of said plunger to limit the movement of said plunger outwardly of said cavity, said plunger being assembled with said housing through said housing open side to be located under said housing portion, and means removably secured to said housing and extending across a portion of the opening in said open side to retain said plunger after assembly and also to limit movement of said plunger outwardly of said cavity.

5. A wiring device comprising a metallic bracket, at least one housing member, means for securing said housing member relative to said bracket, said housing having a cavity extended inwardly from an open side thereof, an insulative plunger member being positioned in said cavity for movement to and from said open side, spring means positioned in said cavity and biasing said plunger outwardly of said cavity, contact means being supported by said plunger, a portion of said housing being engageable with a portion of said plunger to limit the movement of said plunger outwardly of said cavity, said plunger being assembled with said housing through said housing open side to be located under said housing portion, and means removably secured to said housing and extending across a portion of the opening in said open side to retain said plunger after assembly and also to limit movement of said plunger outwardly of said cavity.

6. A wiring device comprising a bracket member for mounting a housing, spaced contact elements being suitably supported in said housing inwardly of a front side thereof and respectively engaging power conductors, spaced channels being open through the side of said housing opposite said front side and extending to the exterior of said housing substantially parallel to said housing front side for passage of said conductors from said contact elements to an external energy source, any of said channels being usable for this purpose on the basis of conveniency, respective insulative members being positioned in said housing to close each of the unused channels for safety purposes, and means for securing said housing to said bracket member, said bracket member engaging said insulative members to hold the latter in said channel closing positions.

References Cited in the file of this patent

UNITED STATES PATENTS

| | | |
|---|---|---|
| 2,384,956 | Mueller et al. | Sept. 18, 1945 |
| 2,716,739 | Lemmers | Aug. 30, 1955 |
| 2,728,057 | O'Donnell et al. | Dec. 20, 1955 |
| 2,743,424 | Hassinger | Apr. 24, 1956 |
| 2,847,561 | Huerkamp et al. | Aug. 12, 1958 |

FOREIGN PATENTS

| | | |
|---|---|---|
| 561,377 | Canada | Aug. 5, 1958 |
| 1,025,335 | France | Jan. 21, 1953 |